April 23, 1935.  W. S. BREMER  1,998,920
COOKING UTENSIL
Filed May 6, 1932  2 Sheets-Sheet 1

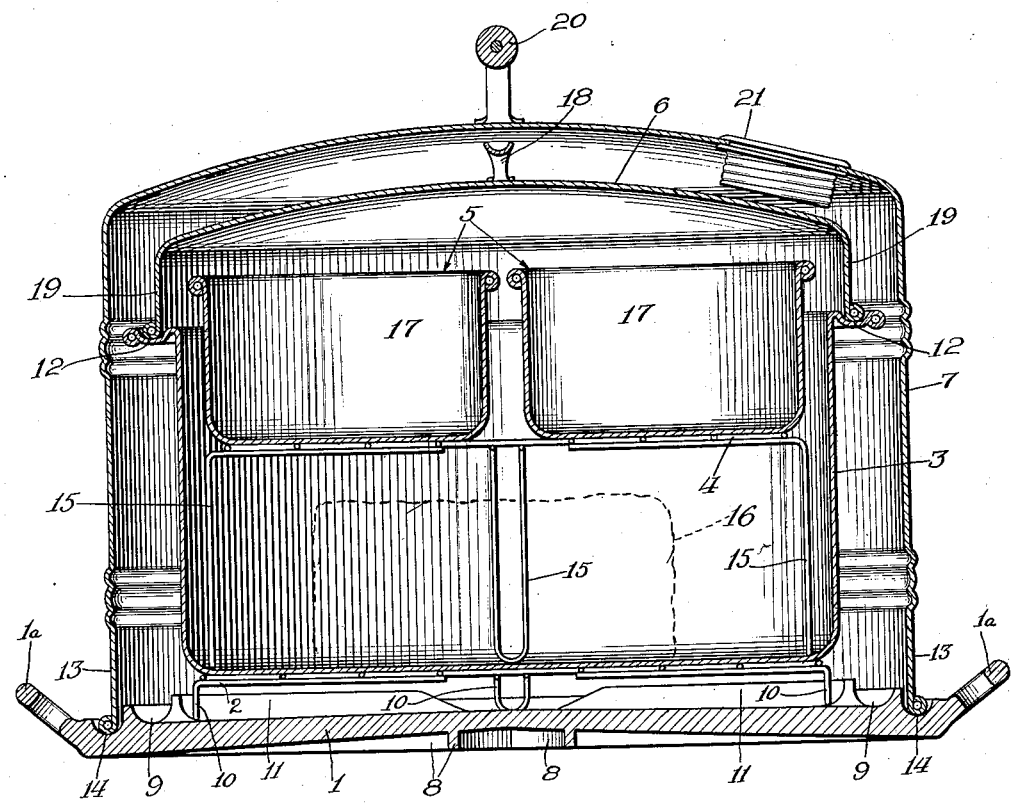

Patented Apr. 23, 1935

1,998,920

UNITED STATES PATENT OFFICE 1,998,920

COOKING UTENSIL

William S. Bremer, Chicago, Ill.

Application May 6, 1932, Serial No. 609,681

3 Claims. (Cl. 53—1)

This invention relates to cooking utensils, and more especially to those of multiplex character and permutative organization for variant uses, and comprising separable parts which are adapted substantially for nesting together somewhat, or to a greater or less degree, according to the particular uses for which the utensil may be applied, such devices usually being independently portable and adapted to be set over a gas flame or other convenient source of heat for cooking use.

The modern tendency toward small families, and small and inexpensive apartments and kitchenettes, and even one-person cooking outfits, and the demand for better food, consistently with speed, along with room overheat avoidance and space saving, has created a demand for improved and standardized domestic economy, and for simplified and more efficient cooking means, especially in small units.

The main objects of the invention are to provide an improved and simplified form of multiple service cooking utensil of the character referred to; to provide such a device adapted for a considerable range of diverse functions, and especially adapted for conjoint use in cooking various objects or articles of food; to provide such a utensil adapted for quickly and properly cooking different foods either independently in disassembled cooker elements, or in appropriate co-assembled compartments, and more uniformly than usual; to provide for alternative roasting or baking needs consistently with mutually common means; to provide such a device adapted, in effect, for automatic basting of meats while roasting; to provide for effective water sealing of the device in use; to provide a plural seal of this sort; to provide such an oven or cooker implement adapted to reduce the necessary cooking time, and adapted for enhanced convenience and economy, both as to fuel efficiency and cooking operations, and as to convenience in use and space economy; to provide for economic separation and collection of grease in meat broiling or grilling; to provide such a device in small and compact units of inexpensive design and fitted for ready assemblage and taking apart, with all members formed and adapted for ready cleaning access; and to provide such a device of minimum heat radiating effect, for use in hot weather.

This invention is illustrated by the accompanying drawings, in which:

Fig. 2 is a vertical axial section through the device with its parts all assembled or nested snugly together.

Figure 1:
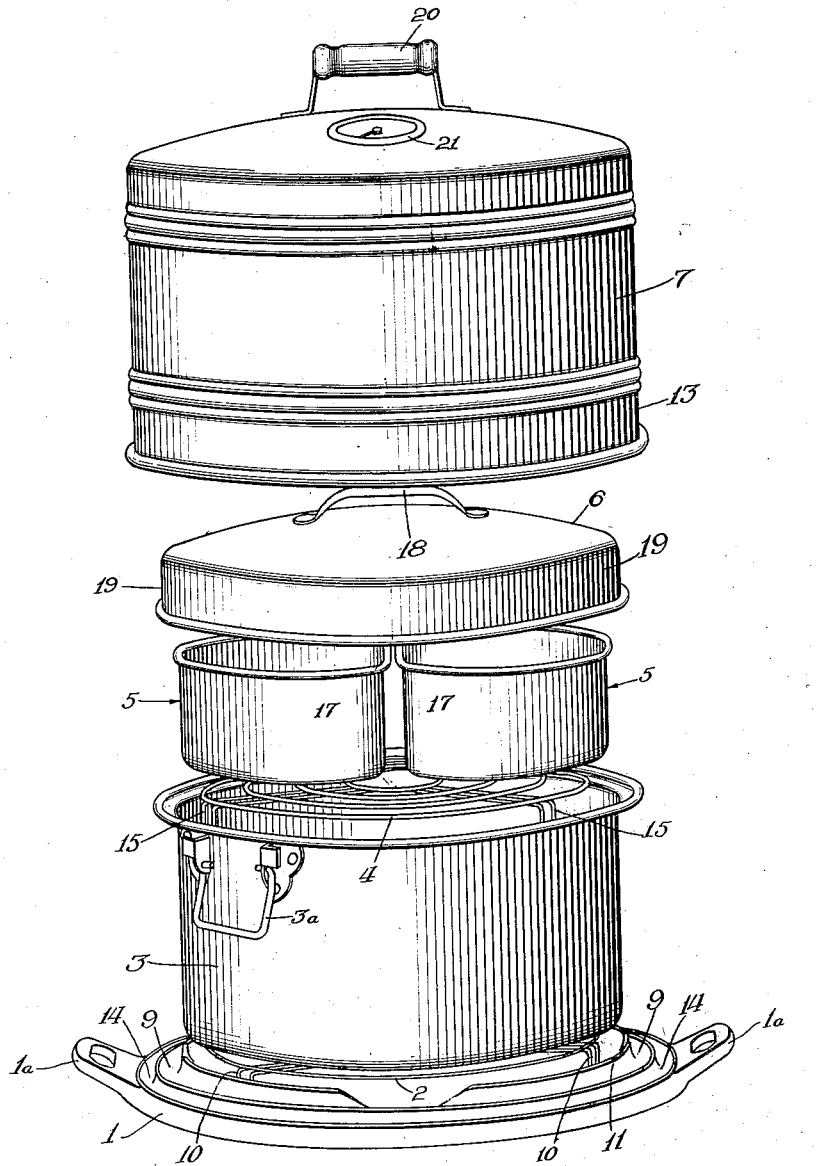
Figure 1 is a side view of the device with its several members assembled in normal vertical alinement, but vertically spaced apart somewhat for illustrative convenience.

In the construction shown the device as a whole comprises a base or griddle plate 1, a grill rack or broiler frame 2, a roasting pot 3, a stage frame 4 to rest in said pot, a vegetable cooker or steamer vessel 5 to rest on said stage frame, a cover 6 for the roaster, and an omnibus closure or oven cover 7 having a deep downward flange to engage the rim of plate 1 and sealingly enclose the device as a whole.

The said base plate or griddle iron 1 has fins 8 on its under side so as to collect heat efficiently for effectively energizing the several cooking elements ordinarily assembled on said plate. The upper face slopes somewhat from the center toward the rim, so that all fats and greases will flow outward and collect in the groove or trough 9, as in broiling meats. Handles are indicated at 1a.

The broiler grid 2 has feet 10 to rest on plate 1 just inside the trough wall 11, or on the top of the stove when used directly without plate 1.

The roasting pot 3, havnig handles 3a, normally rests on grid 2 so that it may be surrounded by an atmosphere of uniformly heated air when the cover 7 is applied. The pot cover 6 rests snugly on the ledge 12 and provides an inner seal, while the outer cover 7 provides an outer seal, by reason of its deep rim 13 fitting snugly in the outer groove 14 on plate 1. The condensation of steam causes water to collect at the contact rings 12 and 14, thus providing water seals for the minor and major covers respectively.

The frame 4 has feet 15 to extend downwardly adjacent to the walls of pot 3 and rest on the bottom of said pot, and so support the vegetable cooker 5 partly or mainly within pot 3, just above the roast 16.

The member 5 may be of any desired design but is preferably made in independent complementary sections 17, so that several articles may be cooked therein independently of one another.

The pot cover 6 has a handle 18 and the downward flange 19 provides space for the upper part of member 5. The outer cover 7 has a handle 20 at the top, and adjacent thereto at 21, a heat indicator and ventilator. This cover 7 serves to retain, conserve and uniformly distribute the heat about the articles to be cooked. It serves in effect as an oven, and as such is adapted for use in general baking, as well as the special uses above indicated. By means of this multiple cooker vegetables may be cooked while the meat is roasting, or if desired the meat may be broiled while other foods are being cooked above, and without basting.

For making toast or toasted sandwiches the plate 1 and rack 2 may be used with or without the cover 7. For cooking or baking on top of the stove the utensils should be placed on the rack and the cover placed over the utensils.

The device is provided with a heat indicator and ventilator at the top of the cover in order to show temperature and create circulation so that dry heat will be uniformly distributed in the oven cover. This utensil will cook a roast in less time than any other device known to me, and at the same time brown it all around, on account of the higher temperature at which my oven can be operated economically.

For making combination dinners consisting of meat, potatoes and vegetables all at one time, my utensil performs uniformly and effectively, and when the cover 7 is used over the utensil it does it in less time than with any other devices known to me. The double water seal is an especially desirable and important feature of my said utensil, for it assures uniform heat, conserves desirable moisture and avoids the necessity of hand basting.

It is to be understood that some of the details set forth may be altered or omitted without departing from the spirit of the invention as defined by the following claims.

I claim:

1. A stove accessory device of the class described comprising a griddle plate having an upward rim, a broiling grid having feet fitting within said rim, a roasting pot seatable either on said grid or directly on said plate within said rim, an open frame to fit in said pot, a liquid-tight vessel to rest on said frame largely within said pot, a snug fitting cover for said pot, and a deep outer cover to snugly engage said plate and enclose the said members resting thereon.

2. A multiplex cooking utensil of the class described comprising a base plate adapted for use as a griddle, a broiler grid resting thereon, a roasting pot to seat on said grid, an open supporting frame formed and adapted to fit within said pot with its upper face well below the rim of the pot, a liquid-tight vegetable cooker to rest upon said support and to repose largely within said pot, a minor cover fitting downwardy on said pot and a downwardly open deep major closure cover, the edges of said minor cover and pot being formed and adapted to interfit snugly, and the abutting edges of the base plate and major cover being also formed to interfit snugly.

3. A device of the class described comprising a plate adapted to serve as a griddle and also being adapted to serve as part of a broiler, said plate having upstanding rims adjacent to its outer edge with grooves therebetween, in combination with a pot adapted to rest within the inner rim, and a cover adapted to seat in the outermost groove, said grooves being adapted to retain the juice when used as a broiler and to center the pot and cover when used as a roaster, and hold the same in duly spaced concentric relation.

WILLIAM S. BREMER.